United States Patent [19]

Tsujiuchi et al.

[11] Patent Number: 4,700,483
[45] Date of Patent: Oct. 20, 1987

[54] POSITION DETECTION DEVICE FOR MOVABLE HEAD

[75] Inventors: Toshio Tsujiuchi, Kariya; Yasuo Niino, Gamagouri, both of Japan

[73] Assignee: Toyoda Koki Kabushiki Kaisha, Kariya, Japan

[21] Appl. No.: 857,161

[22] Filed: Apr. 29, 1986

[30] Foreign Application Priority Data

Apr. 30, 1985 [JP] Japan .............................. 60-63206[U]

[51] Int. Cl.$^4$ ............................................. G01B 11/02
[52] U.S. Cl. .................................................. 33/125 R
[58] Field of Search ............. 33/125 R, 125 A, 125 C, 33/143 L, 147 N, 172 E

[56] References Cited

U.S. PATENT DOCUMENTS 3,899,255 8/1975 Meier ............................ 33/125 C X
4,448,531 5/1984 Seigo ................................. 33/125 C
4,484,391 11/1984 Narimatsu ......................... 33/125 C Primary Examiner—Harry N. Haroian
Attorney, Agent, or Firm—Oblon, Fisher, Spivak, McClelland & Maier

[57] ABSTRACT

A device for detecting the position of a wheel head of a grinding machine is provided with a housing secured to the wheel head and a support rod secured at its opposite ends to a stationary base in parallel relation with the moving direction of the wheel head. The support rod passes through the housing at a pair of holes formed on opposite end walls of the housing. A linear scale is secured to the housing within the housing, and a scanning unit is fixed on the support rod within said housing for reading scale gratings on the linear scale when the housing is moved bodily with the wheel head relative to the support rod.

6 Claims, 4 Drawing Figures

POSITION DETECTION DEVICE FOR MOVABLE HEAD

BACKGROUND OF THE INVENTION

1. Field of the Invention

The present invention relates to a device for detecting the position of a movable head such as tool slide, work table or the like in machine tools. More particularly, it relates to such a detection device suitable for use at those portions of machine tools which are contaminated by coolant, chips, dust or the like.

2. Description of the Prior Art

Generally, numerical control machine tools are provided with a device for detecting the position of a movable head. A typical position detection device for such purpose includes a linear scale with scale gratings secured to a machine base and a scanning unit secured to a movable head for reading the scale gratings on the linear scale upon movement of the movable head. For precise position detection, the linear scale and the scanning unit must be protected against contamination by dust, chips, coolant and the like. To this end, in a known device as disclosed in Japanese unexamined, published patent application No. 59-183307, a housing fixed to a machine tool bed accommodates therein a linear scale attached to the housing and a scanning unit connected to a movable head. However, sealing elements for covering an opening of the housing do not provide a fluid-tight capability because they cannot perfectly seal opposite end portions of a connection member which extends through the opening of the housing to connect the scanning unit to the movable head.

Particularly, in grinding machines, the tilting of a wheel carrier or head occurs due to a grinding resistance, and for diminishing the affect by such tilting motion of the wheel head, it is desirable to dispose a detection device of the aforementioned type at one side of the wheel head where a grinding wheel is also disposed. However, such one side of the wheel head is subjected to splashing of coolant, and therefore, the position detection device as used in the grinding machines is required to have an enhanced fluidtight capability.

SUMMARY OF THE INVENTION

Accordingly, it is a primary object of the present invention to provide an improved position detection device capable of being used under a fluid splashing environment.

Another object of the present invention is to provide an improved position detection device having a mechanism which is reliable and allows for easy sealing of a linear scale and a scanning unit against dust, chips, coolant, mist or the like.

Briefly, according to the present invention, there is provided a position detection device comprising a closed housing secured to one of a movable head and a stationary base and a support rod secured at opposite ends thereof to the other of the movable head and the stationary base in parallel relation with the moving direction of the movable head. The housing is formed with a pair of holes at opposite end walls thereof spaced in the moving direction of the movable head, and the support rod passes through the housing at the holes. A linear scale is secured to the housing within the housing in parallel relation with the support rod, and a scanning unit is fixedly mounted on the support rod within the housing for reading scale gratings on the linear scale when the housing is moved together with the linear scale.

With this configuration, since the sealing at each of the holes is easy, the inside of the housing can be reliably partitioned from the external, so that the linear scale and the scanning unit within the housing can be prevented from being contaminated by dust, chips, coolant, mist or the like.

BRIEF DESCRIPTION OF THE ACCOMPANYING DRAWINGS

Various other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which.

DESCRIPTION OF THE PREFERRED EMBODIMENT

Figure 1:
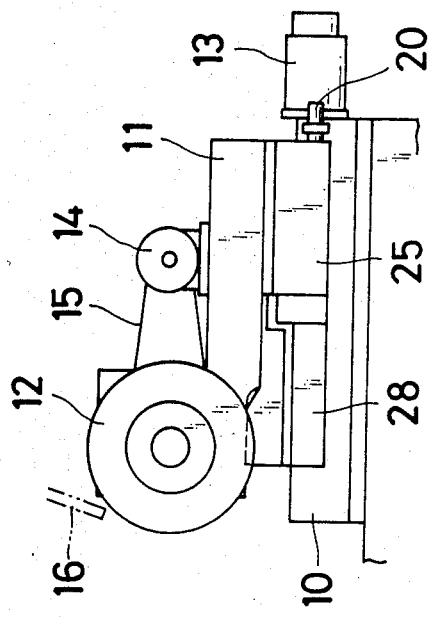
FIG. 1 is a fragmentary side view of a grinding machine with a position detection device according to the present invention.

Referring to the drawings illustrating the present invention as applied to a grinding machine and particularly to FIG. 1 thereof, reference numeral 10 denotes a stationary base, on which a wheel head 11 is guided for sliding movement. The wheel head 11 rotatably carries at one side thereof a grinding wheel 12, which is rotationally driven by a drive motor 14 mounted on the wheel head 11, through a pulley-belt mechanism 15. A servomotor 13 is secured to the stationary base 10, and the rotation of the servomotor 13 is converted through a screw-nut mechanism (not shown) into linear motion of the wheel head 11. A coolant ejection nozzle 16 is provided for supplying coolant to a grinding point between the grinding wheel 12 and a workpiece (not shown) ground thereby.

Figure 2:
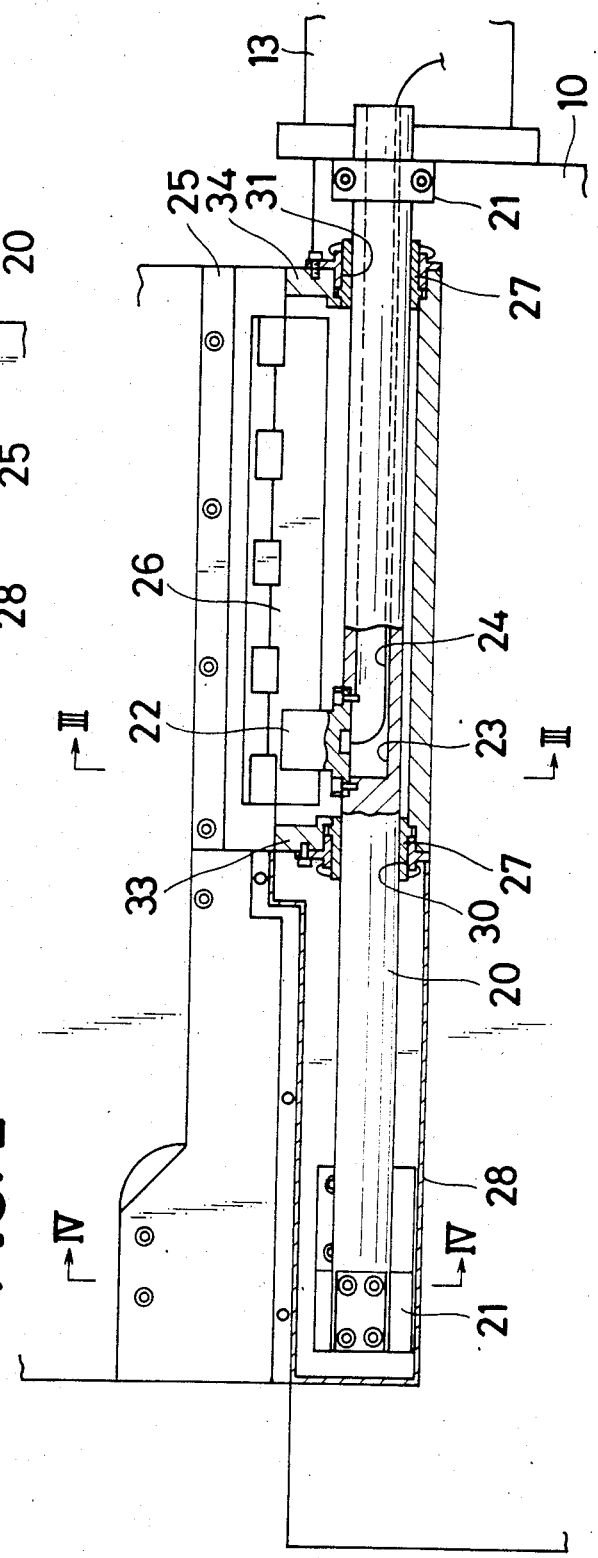
FIG. 2 is a longitudinal sectional view of the position detection device.
Figure 4:
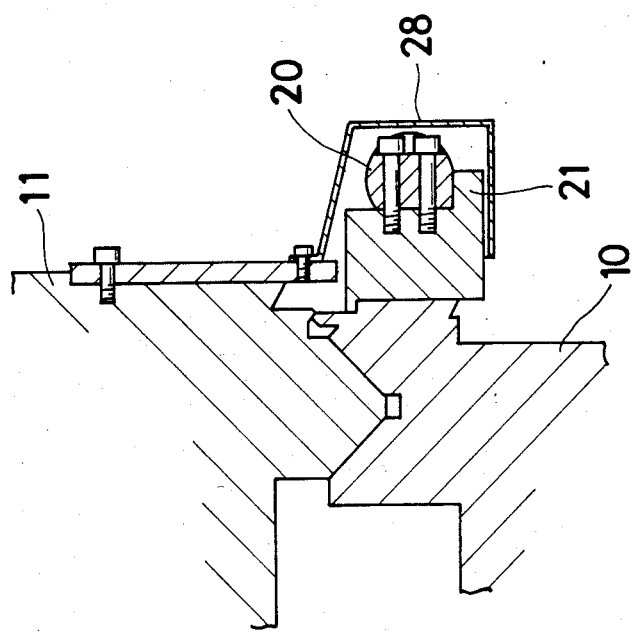
FIG. 4 is another cross sectional view of the device taken along the line IV—IV in FIG. 2.

Referring to FIG. 2, a closed box or housing 25 is secured to one lateral surface of the wheel head 11 at which side the grinding wheel 12 is also disposed. The housing 25 is formed with a pair of front and rear holes 30, 31 in opposite end walls 33, 34 thereof spaced in the moving direction of the wheel head 11, and a support rod 20 passes through the housing 25 at the holes 30, 31. The housing 25 is movable relative to the support rod 20 when the wheel head 11 is moved. Each of the front and rear holes 30, 31 of the housing 25 holds a floating collar 27 which is displaceable relative to the housing 25 only in a radial direction. Thus, the floating collars 27 assure smooth movement of the housing 25 relative to the support rod 20 even if an exact parallel relation between the axis of the support rod 20 and the moving direction of the wheel head 11 is not established. Each of the floating collars 27 retains in an annular cavity (not shown) at its internal surface one or more sealing elements (not shown) for fluidtight engagement with the external surface of the support rod 20.

A linear glass scale 26 is attached or affixed to the housing 25 within the housing 25. A plurality of scale gratings (not illustrated) are formed on the linear scale 26 at a predetermined interval in the longitudinal direction which coincides with the moving direction of the wheel head 11. A scanning unit 22 for reading the scale gratings is secured on a portion of the support rod 20 located within the housing 25. The linear scale 26 and the scanning unit 22 are known as "NC-Linear Transducer", Model LID 300/LID 310, available from HEIDENHAIN JAPAN K.K., Tokyo, Japan. The support rod 20 is formed with a radial hole (not numbered) at the mounting portion for the scanning unit 22 and also with an axial hole 23 which opens toward the radial hole at one end as well as to a rear end of the support rod 20 at the other end thereof. A lead wire 24 from the scanning unit 22 is led through the radial hole and the axial hole 23 externally of the support rod 20 for connection with an suitable external device. Thus, the lead wire 24 has less chance to be cut off as it does not move upon movement of the wheel head 11.

Figure 3:
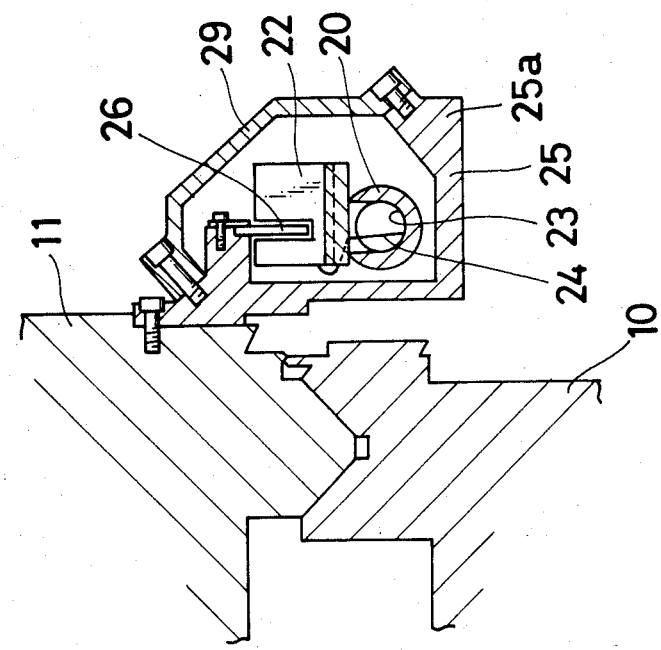
FIG. 3 is a cross sectional view of the device taken along the line III—III in FIG. 2.

As shown in FIG. 3, the closed housing 25 includes a housing body 25a secured to the wheel head 11 and a detachable cover member 29 which covers an upper portion and one side portion of the housing body 25a, so that the inside of the housing 25 is fluidtightly partitioned from the external. Further, a cover 28 is secured to the lateral surface of the wheel head 11 for covering the portion of the support rod 20 that is exposed from the front wall 33 of the housing 25.

When the wheel head 11 is moved upon operation of the servomotor 13, the housing 25 is moved bodily with the wheel head 11. The scanning unit 22 reads the scale gratings on the linear scale 26 moved together with the housing 25, whereby the moving position of the wheel head 11 can be detected.

It is to be noted that the same effect as accomplished by the above-described embodiment can be realized even where a modification is made in such a manner that the housing 25 with the linear scale 26 and the cover 28 are secured to the stationary base 10 while the support rod 20 with the scanning unit 22 is secured to the wheel head 11. It is also to be noted that the present invention may be applied to various types of machine tools other than grinding machines and preferably, to those portions of the machine tools subjected to contamination by coolants, mist, dust, chips or the like.

Obviously, numerous modifications and variations of the present invention are possible in light of the above teachings. It is therefore to be understood that within the scope of the appended claims, the present invention may be practiced otherwise than as specifically described herein.

What is claimed is:

1. A position detection device for a movable head which is movable on a stationary base for linear motion, comprising:
   a closed housing secured to one of said movable head and said stationary base and having a pair of holes opening at opposite end walls thereof spaced in the moving direction of said movable head;
   a support rod secured at opposite ends thereof to the other of said movable head and said stationary base in parallel relation with the moving direction of said movable head and passing through said housing at said pair of holes wherein said support rod is uniform in cross-sectional area at any point along its longitudinal axis so that no volume change occurs in a space defined by an inside surface of said closed housing and an external surface of said support rod during movement between said closed housing and said support rod;
   a linear scale secured to said housing within said housing and extending in parallel relation with said support rod; and
   a scanning unit fixedly mounted on said support rod within said housing and responsive to the movement of said linear scale for detecting the position of said movable head.

2. A position detection device as set forth in claim 1, wherein:
   said support rod is formed with an axial hole which is opened and extends to a position external of said housing at a first end of said support rod, for leading a lead wire of said scanning unit to said position external of said housing.

3. A position detection device as set forth in claim 1, further comprising:
   a cover secured to said one of said movable head and said stationary base for covering a portion of said support rod which projects from one of said opposite end walls of said housing.

4. A position detection device as set forth in claim 1, wherein said support rod is formed with an axial hole which extends to a position external of said housing at a first end of said support rod, for leading a lead wire of said scanning unit to said position external of said housing, said position detection device further comprising:
   a cover secured to said one of said movable head and said stationary base for covering a portion of said support rod which projects from one of said opposite end walls close to a second end of said support rod.

5. A position detection device for a movable head which is movable on a stationary base for linear motion, comprising:
   a closed housing secured to one of said movable head and said stationary base and having a pair of holes opening at opposite end walls thereof spaced in the moving direction of said movable head;
   a support rod secured at opposite ends thereof to the other of said movable head and said stationary base in parallel relation with the moving direction of said movable head and passing through said housing at said pair of holes;
   a linear scale secured to said housing within said housing and extending in parallel relation with said support rod; and
   a scanning unit fixedly mounted on said support rod within said housing and responsive to the movement of said linear scale for detecting the position of said movable head wherein said support rod is formed with an axial hole which extends to a position external of said housing at a first end of said support rod, for leading a lead wire of said scanning unit to said position external of said housing, said position detection device further comprising:
   a cover secured to said one of said movable head and said stationary base for covering a portion of said support rod which projects from one of said opposite end walls close to a second end of said support rod and wherein said housing comprises a housing body secured to said one of said movable head and said stationary base and having said opposite end walls formed with said pair of said holes, said housing body also having at least at its top side an opening for permitting the incorporation of said linear scale and said scanning unit into said housing body; and a cover member detachably secured to said housing body for covering said opening of said housing body.

6. A position detection device for a movable head which is movable on a stationary base for linear motion, comprising:
- a closed housing secured to one of said movable head and said stationary base and having a pair of holes opening at opposite end walls thereof spaced in the moving direction of said movable head;
- a support rod secured at opposite ends thereof to the other of said movable head and said stationary base in parallel relation with the moving direction of said movable head and passing through said housing at said pair of holes;
- a linear scale secured to said housing within said housing and extending in parallel relation with said support rod;
- a scanning unit fixedly mounted on said support rod within said housing and responsive to the movement of said linear scale for detecting the position of said movable head; and
- a pair of floating collars loosely received respectively in said pair of said holes formed on said opposite end walls and displaceable only in a radial direction of said support rod, said floating collars having holes which permit said support rod to pass therethrough fluidtightly.

* * * * *